Jan. 7, 1936.   A. PROCOFIEFF-SEVERSKY   2,026,912

VARIABLE SPEED DRIVE FOR CALCULATOR MECHANISM

Original Filed Nov. 23, 1923    4 Sheets—Sheet 3

Inventor
Alexander Procofieff Seversky
By his Attorneys
Emery Booth Janney & Varney

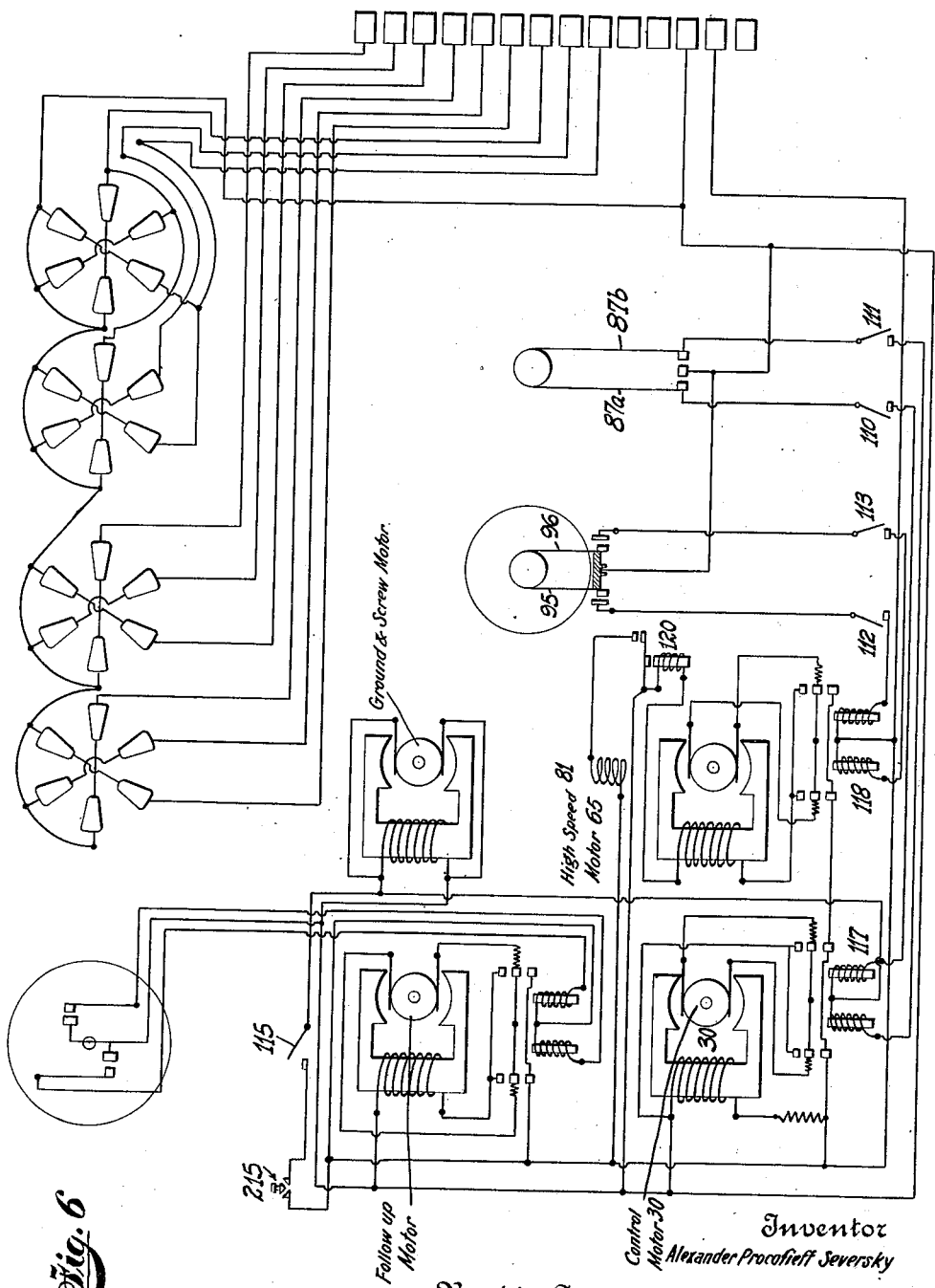

Patented Jan. 7, 1936

2,026,912

UNITED STATES PATENT OFFICE 2,026,912

VARIABLE SPEED DRIVE FOR CALCULATOR MECHANISM

Alexander Procofieff-Seversky, New York, N. Y., assignor to Seversky Aero Corporation Application November 23, 1923, Serial No. 676,493
Renewed October 6, 1934

22 Claims. (Cl. 33—46.5)

The present invention relates to apparatus for use in aircraft for calculating the speed and range angle and may be treated as an improvement on the construction shown in my co-pending application for Range finding and flight directing apparatus for use in aircraft Serial No. 645,980, filed June 19, 1927.

In said application, the calculating mechanism described comprises a ground speed screw driven under control from a movable sight in both directions by a reversible ground speed motor, the speed of the screw being controlled by a control motor which varies the ratio of the transmission gearing between the motor and screw. While the arrangement there described is very satisfactory under some conditions of use of the device, there are other conditions under which a more immediate response to changes in the movement or rate of movement of the sight than is provided by that arrangement, is desirable. Furthermore in said mechanism, the ground speed indicator is controlled by gearing which drives the ground speed screw, and therefore, the indicator responds to all changes in the operation of this gearing. Accordingly when movement of the sight changes quickly, as for example, when after one bomb has been dropped, the sight is moved to pick up a new target further ahead, or when for other reason, the normal operation of the gearing is temporarily disturbed, the speed indicator is necessarily disturbed and gives an erroneous indication. The major part of the range angle calculating mechanism is controlled by the speed indicator and therefore in its turn is also disturbed and caused to operate in a manner that causes unnecessary wear on the parts and temporarily indicates the range angle incorrectly.

The present invention has for an object to provide an improved driving mechanism for the ground speed screw, and especially a mechanism which will operate in a manner to disturb as little as possible the normal operation of the ground speed motor, the connecting gearing and speed indicator, and which will reduce the unnecessary actuation of the calculating mechanism to reduce the wear thereon.

The invention further has for an object to provide an improved mechanism whereby synchronizing movements of the ground speed screw are accomplished quickly and effectively and hunting is reduced.

The nature and objects of the invention will be more clearly understood from a description of a particular illustrative embodiment thereof, for the purpose of which description reference should be had to the accompanying drawings forming a part thereof, in which Figure 1 is a view in elevation of a mechanism embodying the invention for driving the ground speed screw of a calculator.

Figure 6 is an electrical diagram showing the electrical connections of the complete calculator apparatus including the connections peculiar to the present invention.

Figure 2:
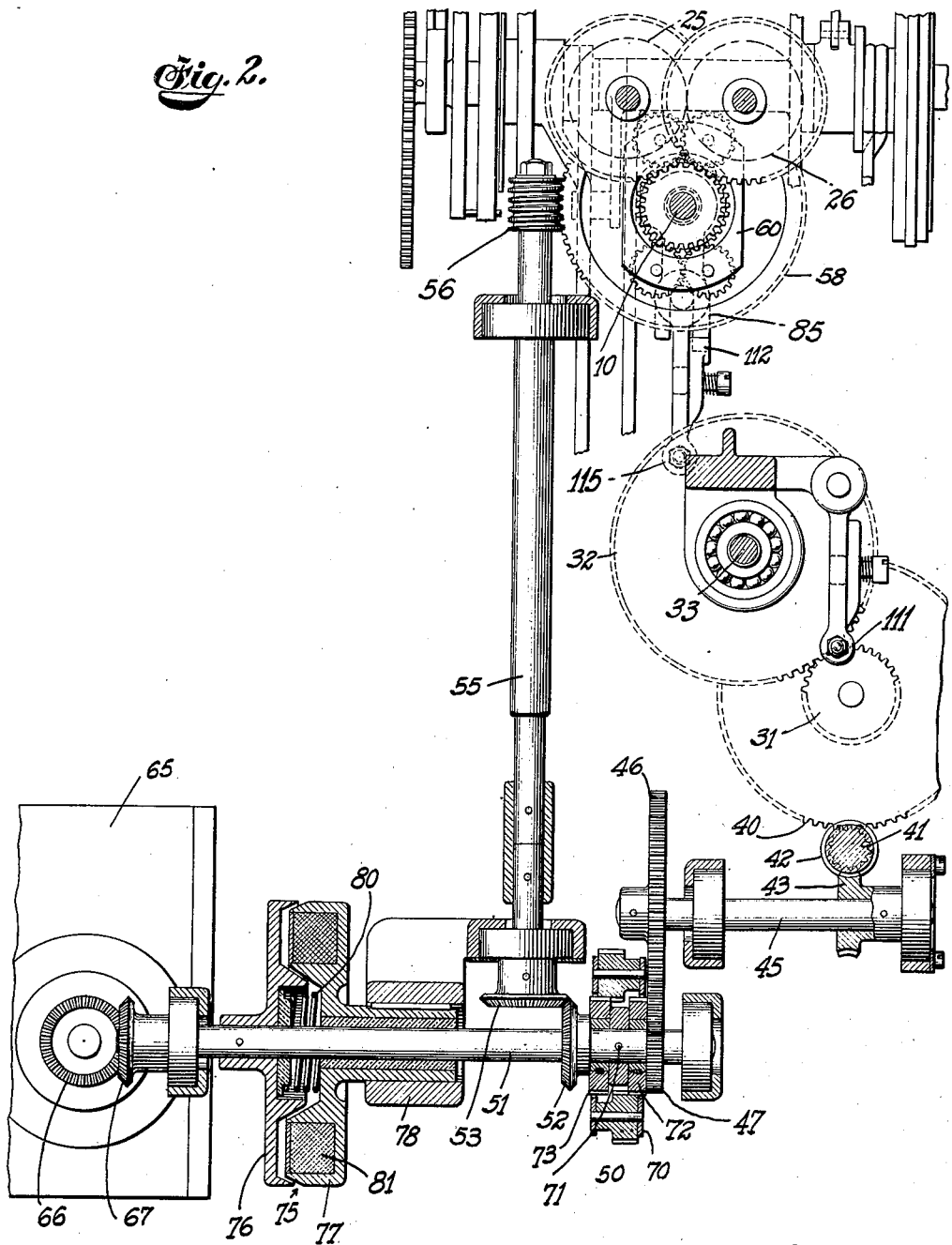
Figure 2 is a sectional view of the same mechanism taken on the line 2—2, Figure 1.

The mechanism illustrated, and more particularly to be described for the purpose of illustrating the invention comprises a ground speed shaft or screw 10, which is driven from a constant speed ground speed motor 11, through suitable variable speed gearing. As shown the gearing comprises opposed friction disks 12 and 13 with a shiftable friction ball movable radially therebetween. The disk 12 is mounted upon the motor shaft. The disk 13 is mounted upon a shaft 16, which carries at its other end a pinion 17, meshing with a gear 18 on shaft 19. Shaft 19 in turn through intermeshing pinion 20 and gear 21 drives shaft 22 which carries a friction disk 23. This friction disk through a shiftable friction ball 24 drives two friction rolls 25 and 26 (see Fig. 2). The roll carrying shafts are provided upon their outer ends with gears 27 and 28 which are connected through the intermediary of a differential mechanism 60 hereinafter described, to drive the ground speed screw 10.

The friction ball 24 may be shifted to a position corresponding to the altitude by mechanism not herein shown but fully described in the co-pending application, to which reference has been made. This mechanism need not be herein described since further consideration thereof is unnecessary to a complete understanding of the present invention. The friction ball 15 is shiftable readily by suitable mechanism under control of a control motor 30. As herein shown, pinion 31 on the motor shaft meshes with a gear 32 on the control screw 33. As this screw is driven by the control motor, nut 35 is shifted therealong. This nut forms a rigid part of the shifter 36, which controls the position of the ball 15.

When the apparatus is in use, the ball 24 is set to position corresponding to the altitude, and by means of the control motor, 30, and associated mechanism, the ball 15 is shifted to suitable position so that the ground speed screw 10 will be driven at a rate of speed corresponding to the rate of change of the cotangent of the angle of depression of the observer's sight from which the apparatus is controlled. The mechanism so far described is substantially the same as that shown and described in the co-pending application, to which reference has been made.

In the apparatus described in the above-mentioned application, the ground speed motor is actuated in both directions to drive the ground speed screw either forward or in reverse direction. In the present construction, the ground speed motor preferably operates always in one direction and other mechanism is provided for driving the ground speed screw in a reverse direction. This arrangement simplifies the control mechanism and improves the operation of the mechanism actuated or controlled by the gearing connecting the ground speed motor and ground speed screw.

The ground speed screw 10 of the aforesaid application and in the present structure is driven under automatic control to maintain a nut thereon always in a position having a certain relation to the position of the observer's sight, which sight is maintained, trained upon the target during flight thereover. When the ground speed screw 10 rotates too rapidly or too slowly, causing the nut to lead or lag with respect to its correct position, the control motor 30 is operated through controlling electrical appliances to shift the ball 15 to decrease or increase the speed. Now the controlling devices are not actuated until there is an appreciable lead or lag and an appreciable driving interval elapses before the correction becomes effective at the screw. There is therefore a delay in effecting correction and a tendency to over correction with consequent "hunting." In the mechanism herein disclosed means is provided to effect more immediately the rotation of the ground speed screw. As shown, this means comprises gearing which is actuated by the control motor simultaneously with the actuation of the control screw 33, to give to the ground speed screw 10 a movement of rotation which is independent of the ground speed screw motor 11, and the associaed gearing. As shown, a gear 40 is secured to the shaft of the motor 30, and meshes with a pinion 41, rigidly connected to a worm 42, which in turn drives a worm wheel 43 on the shaft 45. The shaft 45 also carries a gear 46 (see Fig. 2) which meshes with a pinion 47, forming a part of differential mechanism 50 carried by a shaft 51. Through this differential mechanism, a bevel pinion 52 is actuated to drive a bevel pinion 53, and in turn, its shaft 55. The shaft 55 carries a worm 56 which meshes with the worm wheel 58 of the differential mechanism 60. The shaft or screw 10 is thus driven by the differential mechanism 60 which is in turn driven on the one hand by the gears 27 and 28 from the ground speed screw motor 11 and on the other hand by the worm 56, which is driven from the control motor 30 by means of the gearing just described.

The shaft 55 carrying worm 56 may, however, be also actuated from a high speed motor 65 and in either direction. The shaft of the motor 65 carries a bevel pinion 66 which meshes with a pinion 67, carried by the shaft 51. The differential carrier 70 is rigidly keyed to the shaft 51 by means of the pin 71, to rotate therewith. The gear 47 is rigidly connected to a sun pinion 72, and the bevel pinion 52 is rigidly connected to the sun pinion 73. The control motor 30 and the high speed motor 65 may therefore drive independently or simultaneously. Means is provided for holding the shaft 51 against rotation when motor 30 is operating and when the high speed motor 65 is idle. In the arrangement shown, this means comprises a magnetic brake 75 comprising a brake member 76 fixed to the shaft 51, and a brake member 77 slidably secured to its supporting bracket 78, and in which the shaft 51 rotates with a suitable bushing therebetween. The two brake members 76 and 77 are normally separated by a compression spring 80. A magnetic coil 81 is arranged to be energized whenever the motor 65 is idle, to operate the brake and hold the shaft 51 against rotation. As indicated in the electrical diagram, Figure 6, a relay 120 is provided to accomplish this result.

Figure 3:
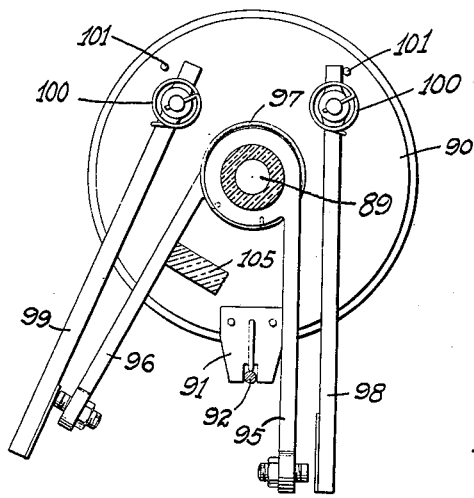
Figures 3, 4 and 5 are detailed views of an electrical controlling mechanism showing the control elements in different relative positions.
Figure 4:
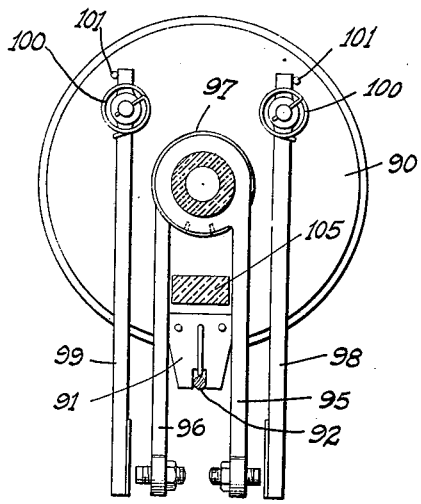
Figure 5:
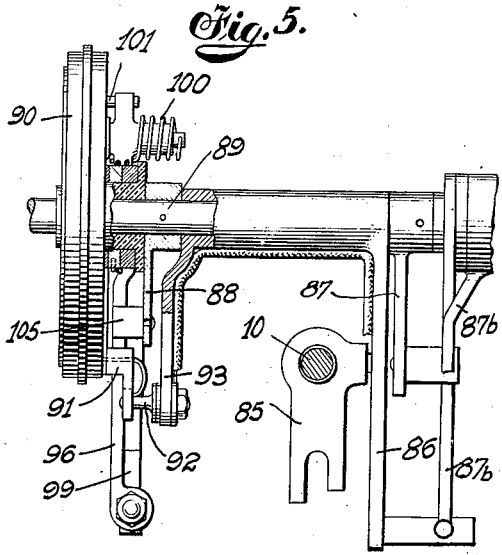

The control mechanism is sufficiently shown for the purpose of the present application in Figures 3, 4, and 5. As in the construction of the aforesaid co-pending application, the ground speed screw 10 is automatically controlled to maintain a follower nut 85 and a follower arm 86 controlled thereby always as nearly as possible in synchronism with a swinging arm 87 which is controlled to move synchronously with the movement of the sight. In the arrangement shown, a control arm 88 is keyed to the shaft 89 as is also the arm 87 so that the arm 88 is controlled to move in synchronism with the sight. A disk 90 is controlled to move with the follower arm 86. In the construction shown, the disk 90 carries a bracket 91 which is engaged by a pin 92 carried by the arm 93 rigidly connected to the follower arm 86. A pair of contact carrying arms 95, 96 are rotatably carried on the shaft 89 and yieldably urged toward each other by a spring 97, each end of which is secured to one of the arms and the body portion of which extends twice around the hubs of these arms. The disk 90 carries a pair of cooperating arms 98, 99 which are yieldably urged toward the arms 95 and 96 by springs 100, the inward movement of these arms being limited by stops 101. A block 105, carried by the arm 88 lies between the arms 95 and 96 and when relative movement in either direction between the arm 88 and the disk 90 occurs, this block by engaging one or the other of the arms 95, 96 will swing it toward the companion cooperating arm.

The arm 87 carries a depending block which lies between the contact arms 87a and 87b. When the arms 86, 87 are in perfect synchronism, the contacts carried by the arms 87a and 87b are disengaged from the corresponding contacts carried by the arm 86, as in my co-pending application but when relative movement occurs contact is made between a contact element carried by one of the arms 87a, 87b with the corresponding contact carried by the arm 86 to close the circuit of the control motor 30.

When relative movement occurs between the control arm 88 and the disk 90, the block 105 engages one of the arms 95, 96 and swings it toward its cooperating arm 98 or 99. If the movement is sufficient contact is made and the high speed motor 65 is started and continued in operation until the disk 90 is again brought substantially into synchronism with the arm 88. It will be clear that when the relative movements between the arms 86 and 87 are relatively small the control motor will be started without starting the high speed motor but when greater differences occur, both motors will be started.

Ordinarily, minor additional rotation of the ground speed shaft or screw 10 is effected through operation of the control motor 30 operating to move the speed changing friction ball 15, and also driving the differential mechanism 60 through the spiral gearing 56 and connecting gearing. Greater adjustments or corrective movements of the ground speed shaft or screw are, however, made through the high speed motor 65 and the connecting gearing. Ordinarily, the control motor 30 is always operating whenever the high speed motor 65 is operating, but frequently the control motor operates while the high speed motor 65 remains idle.

Figure 1:
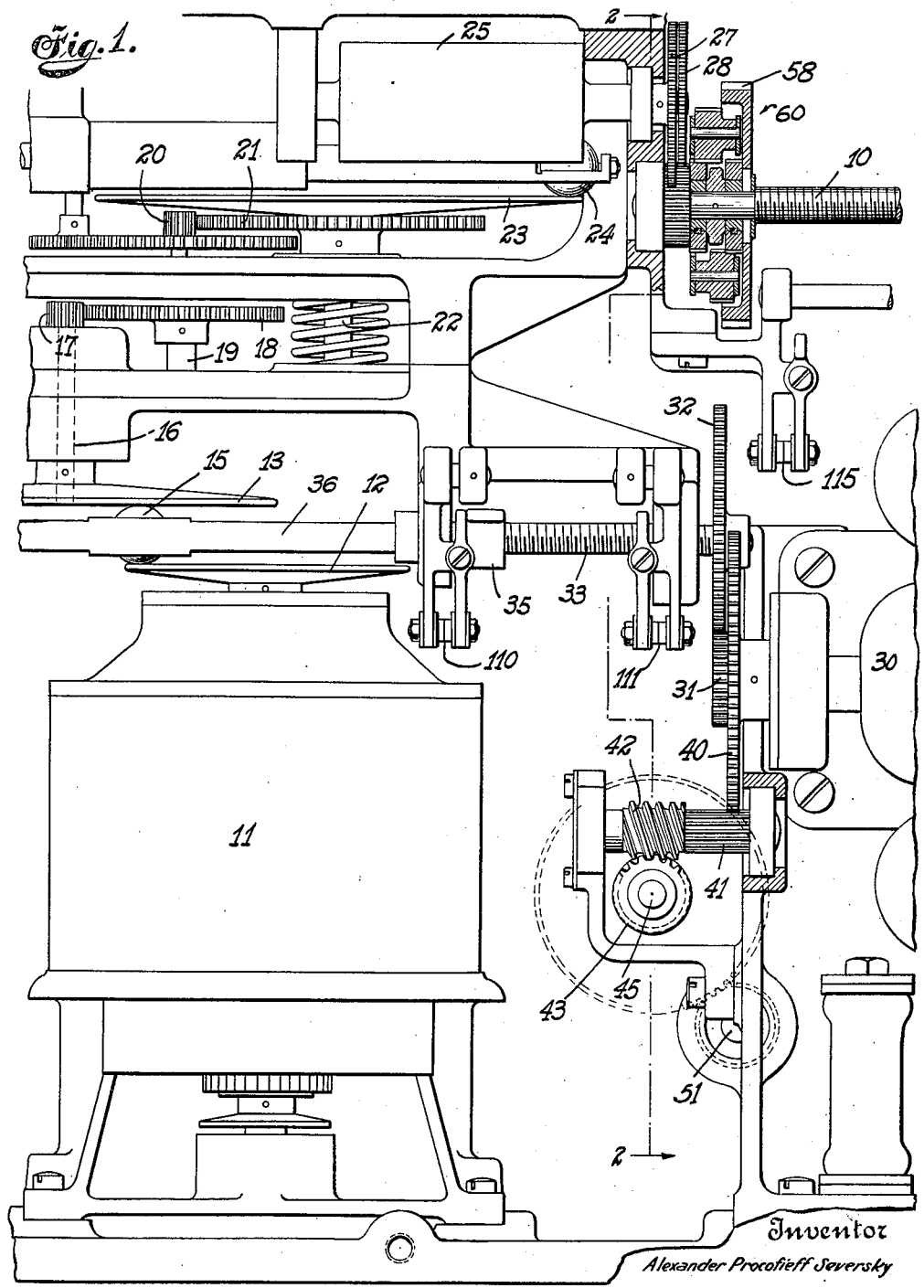

The electrical connections are shown in the electrical diagram, Figure 6. As therein indicated, circuit breakers 110, 111 are provided in the circuits closed by movement of the arms 87a, 87b, which circuits start the control motor 30. These circuit breakers are shown in Figure 1 as positioned at each end of the control screw 33 so that as the nut 35 reaches either end of its travel the control motor is automatically stopped. Circuit breakers 112, 113 are also provided in the circuits controlled by the arms 95, 96 which start the high speed motor. These circuit breakers are in fact positioned at either end of the ground speed screw, one being shown in Figure 2. A circuit breaker is also provided in the circuit of the ground speed motor as indicated at 115 in the electrical diagram, Fig. 6 and in Fig. 2. Inasmuch as the ground speed motor drives the ground speed screw 10 in one direction only, only one circuit breaker for this motor need be provided. The object of these several circuit breakers is obviously to prevent over-running of the motor after the driven element is carried to the limit of its travel in the construction shown.

The control motor 30 and the high speed motor 65 are started through suitable relays 117 and 118 which are suitably arranged to properly determine the direction of drive of the motors under the controls described. It has already been stated that the magnetic brake 75 was automatically operated when the motor 65 was idle and automatically released when the motor 65 operates. In the electrical diagram there is shown a relay 120 which opens the circuit through the magnetic brake coil 81 when the circuit through the field of the high speed motor is closed.

A hand control switch 215 is shown in the circuit of the ground speed motor and control motor whereby these motors can be stopped at will.

The circuits through the depression angle repeaters and the drift repeaters are the same as in the aforesaid co-pending application and need not be herein described.

The operation of the described arrangement is as follows:

The electrical connections are made to supply power to the apparatus. The ground speed motor normally operates continuously. A sight, not shown, is maintained trained upon the target during approach thereto. Through means not herein shown, the arm 87 is moved synchronously with the movement of the sight so that the angular position of this arm corresponds always to the angle of depression of the sight. When the sight is first moved to train it upon the target the movement of the arm 87 and connected arm 88 relative to arm 86 and the connected disk 90 causes the closing of motor circuits to bring the follower arm 86 into a position in synchronism with arm 87. During the swinging movement of the arm 87, as the sight moves following the target, the ground speed motor actuates the screw 10 to similarly swing the arm 86. As the arm 87 moves faster than the follower arm 86 a circuit is first closed through the contact carried by the arm 87a, cooperating with a corresponding contact carried by the arm 86. This causes a circuit to start the control motor 30 in operation. Actuation of the control motor rotates the control screw 33 to shift the ball 15 to the left in Figure 1 thereby to increase the driving ratio between the ground speed motor 11 and the ground speed screw 10. Simultaneously with the actuation of the control screw 33 the motor 30 through a train of gears including worm 42 and worm wheel 43, shaft 45, differential mechanism 50, shaft 55, spiral gear 56 and differential mechanism 60, actuates also the ground speed screw 10. The actuation of the control screw 33 and the ground speed screw 10 through the control motor continues until the arm 86 under control of the nut 85 on the ground speed screw 10 comes into a position of synchronism with the arm 87 thereby opening the control circuit. If the relative movement between the arms 86 and 87 exceeds a certain predetermined amount then a further circuit is closed between the arm 95 and the corresponding arm 98 to start the high speed motor 65. Actuation of the high speed motor drives the ground speed screw 10 through a train of gearing comprising the shaft 51, differential mechanism 50, shaft 55 and differential mechanism 60. Such actuation of the ground speed screw through the high speed motor 65 continues until the control circuit is again open by virtue of the arms 86, 87 approaching relatively synchronized position. In this arrangement the control motor performs two functions. When the ground speed shaft or screw 10 lags relative to the sight because the speed of drive from the motor 11 is insufficient, the control motor 30 causes a shifting of the friction ball 15 to increase the speed and simultaneously it gives an independent rotation to the shaft 10 to cause it to catch up to synchronized position. If the change of speed thus effected is insufficient, the follower on the screw 10 will again lag causing the arm 86 again to lag relative to the arm 87 closing the control contact through one of the arms and the friction ball 15 will again be shifted to further increase the speed and at the same time the ground speed screw 10 will be given further rotation. If the correction is excessive then a different circuit will be closed to reduce the speed of drive by shifting the ball 15 and the screw 10 will be actuated momentarily in the opposite direction.

After a bomb is dropped and the sight is raised through a substantial angle to sight on a new target, the arm 87b first moves to close a circuit which starts the control motor in a direction to shift the friction ball 15 to the right in Figure 1 thus decreasing the speed of drive from the ground speed motor 11 to the ground screw and to simultaneously drive the ground speed screw through the shaft 55 and associated gearing, and then the arm 88 swings the arm 96 against the arm 99 to close another circuit and start the high speed motor to actuate the ground speed screw 10 through the shaft 51, differential 50, shaft 55, spiral gear 56 and differential 60. The arm 86 is thus quite rapidly moved into synchronism with the arm 87.

It will be understood that the description of the particular embodiment is illustrative merely and is not intended as defining the limits of the invention and that various modifications may be made without departing from the scope of the invention.

I claim:

1. In automatically controlled variable speed driving mechanism, the combination with a shaft of a constant speed motor, variable speed gearing connected to drive said shaft from said motor, a control motor connected to the variable speed gearing to increase and decrease the speed ratio thereof and means actuated by said control motor to actuate said shaft independently of the variable speed driving mechanism in one direction simultaneously with an increase of the speed ratio and in the other direction simultaneously with a decrease of the speed ratio.

2. In automatically controlled variable speed driving mechanism, the combination with a driven element of variable speed mechanism for actuating the same, relatively movable control elements, means responsive to one relative position of said control elements to increase the speed ratio of the variable speed mechanism and simultaneously to actuate the driven element in one direction and means responsive to another relative position of said control elements to decrease the speed ratio of the variable speed mechanism and simultaneously to actuate the driven element in the opposite direction.

3. In variable speed driving mechanism, the combination with a driven element of a differential mechanism connected thereto, a motor, a variable speed gearing driven thereby connected to actuate the driven element through said differential mechanism in one direction at a relatively slow speed, a second motor, and automatically controlled gearing driven thereby connected to actuate said driven element through said differential mechanism selectively in either direction at a relatively high speed.

4. In apparatus of the character described, in combination, a movable control element, a shaft, means for actuating the shaft under control of the said movable element comprising a differential mechanism, a motor, gearing connecting said motor to said differential mechanism to actuate the shaft in one direction at a relatively low speed, a second motor, gearing connecting said second motor to the differential mechanism to actuate the shaft selectively in either direction at a relatively high speed, said second motor having circuits opened and closed by movements of said movable control element.

5. In apparatus of the character described, in combination, a shaft, a differential mechanism operatively connected thereto, a motor operatively connected to actuate one element of the differential mechanism, a second motor operatively connected to actuate another element of the differential mechanism in either direction alternatively and means operative under predetermined conditions to start one motor and means operative under predetermined conditions to start the other motor and means operative to prevent the second motor being driven from the differential mechanism when said motor is not operating to drive said differential mechanism.

6. In apparatus of the character described, in combination, a driven shaft, a motor connected to actuate said shaft at variable speed, a control motor arranged to increase or decrease the speed of actuation of said shaft by said first-mentioned motor automatically under predetermined conditions, and independent means actuated by said control motor for temporarily increasing or decreasing the speed of the driven shaft.

7. In apparatus of the character described, in combination, a shaft, a motor, variable speed gearing connecting said motor and shaft, a control motor, connections actuated thereby to increase or decrease the driving ratio of the variable speed gearing, and other connections driven by said control motor for independently actuating said shaft temporarily without disconnecting the first-mentioned connections.

8. In apparatus of the character described, in combination, a shaft, a motor, variable speed gearing connecting said motor and shaft, a control motor, connections actuated thereby to increase or decrease the driving ratio of the variable speed gearing, a high speed motor, and connections driven thereby to actuate said shaft under predetermined conditions.

9. In apparatus of the character described, in combination, a driven shaft, a motor connected to actuate said shaft at variable speeds, a control motor arranged to increase or decrease the speed of actuation of said shaft by said first mentioned motor under predetermined conditions, and independent means controlled by said control motor for temporarily increasing or decreasing the speed of the driven shaft.

10. In apparatus of the character described, in combination, a driven shaft, a differential mechanism connected to actuate the same, a motor, variable speed connections between said motor and said differential mechanism to actuate the latter, a second differential mechanism, driving connections between it and the first-mentioned differential mechanism, a second motor connected to actuate one element of the second mentioned differential mechanism, a third motor connected to actuate another element of said second mentioned differential mechanism, and an automatic control device for controlling the second and third mentioned motors under predetermined conditions.

11. In apparatus of the character described, in combination, a driven shaft, a differential mechanism connected to actuate the same, a motor, variable speed connections between said motor and said differential mechanism to actuate the latter, a second differential mechanism, driving connections between it and the first-mentioned differential mechanism, a second motor connected to actuate one element of the second mentioned differential mechanism, a third motor connected to actuate another element of said second mentioned differential mechanism and connections between said third motor and the variable speed connections to vary the speed thereof.

12. In apparatus of the character described in combination, a ground speed shaft, a differential mechanism connected to actuate the same, a ground speed motor, variable speed mechanism driven by said ground speed motor to actuate one element of the differential mechanism, a high speed motor, a control motor, a differential mechanism connected to be actuated by said high speed motor and control motor jointly and connected in turn to actuate one element of the first mentioned differential mechanism, means actuated by said control motor for increasing and decreasing the speed ratio of said variable speed mechanism and automatically operating means for causing said high speed motor and control motor to drive in either direction under predetermined conditions.

13. In apparatus of the character described in combination, a control arm, a follower arm, a shaft connected to actuate said follower arm, a motor, variable speed gearing between said motor and said shaft to actuate the same at relatively low speeds, a second motor connected to actuate said shaft at a relatively high speed, means for varying the speed of said variable speed gearing, contact elements associated with said control arm and follower arm arranged to close a circuit to actuate said speed varying means upon a comparatively small relative movement between said control arm and follower arm and another set of contacts associated with said control and follower arms arranged upon comparatively greater relative movement between said arms to close a circuit to cause said second motor to actuate said shaft at relatively high speed.

14. In apparatus of the character described in combination, a control arm, a follower arm, a shaft connected to actuate said follower arm, a motor, variable speed gearing between said motor and said shaft to actuate the same at relatively low speeds, a second motor connected to actuate said shaft at a relatively high speed, means for varying the speed of said variable speed gearing, a set of contacts associated with said control arm and follower arm arranged to close circuits to cause said speed varying means to increase or decrease the speed ratio of the variable speed mechanism upon comparatively small relative movement in one direction or the other between said control arm and follower arm, and a second set of contacts associated with said control arm and follower arm arranged to close circuits selectively upon comparatively greater relative movements between said control and follower arms to cause said second motor to actuate said shaft selectively in one direction or the other at relatively high speed.

15. In apparatus of the character described, in combination, a control arm, a follower arm, a shaft connected to actuate said follower arm, variable speed means for actuating said shaft at relatively slow speed, means for actuating said shaft at relatively high speed, electrical contacts associated with said control and follower arms for selectively increasing or decreasing the effective speed of said variable speed actuating mechanism upon comparatively small relative movements in one direction or the other between said control and follower arms and for causing operation of said relatively high speed actuating means upon comparatively greater relative movements between said control and follower arms.

16. In apparatus of the character described, in combination, a pivoted control arm, a pivoted follower arm, a shaft connected to actuate said follower arm, means including variable speed gearing for actuating said shaft, a second motor and connections driven thereby for actuating the shaft at relatively high speed independently of the first mentioned actuating means, a pair of contact carrying arms associated with one of said pivoted arms and spring pressed toward the other from opposite directions but capable of considerable angular movement in opposition to the spring pressure during angular movement between the two pivoted arms, cooperating contacts carried by the contact arms and the pivoted arm toward which the contact arms are spring pressed arranged to close one or the other of two electric circuits as relative movement of the two swinging arms in one direction or the other occurs to vary the speed ratio of the variable speed gearing, a second pair of contact carrying arms associated with one of said pivoted arms and spring pressed toward an element associated with the other, cooperating contacts carried by the second pair of contact carrying arms and said element and arranged to close one or the other of two electric circuits as relative movement of the two pivoted arms in one direction or the other occurs to actuate the high speed motor in one direction or the other.

17. In apparatus of the character described, in combination, a control arm, a follower arm, a shaft connected to actuate said follower arm, variable speed means for actuating said shaft at relatively slow speed, means for actuating said shaft at relatively high speed, electrical contacts associated with said control and follower arms for increasing or decreasing the effective speed of said variable speed actuating mechanism upon comparativly small relative movements in one direction or the other between said control and follower arms and for causing operation of said relatively high speed actuating means upon comparatively greater relative movements between said control and follower arms, the high speed actuating means being operative only while the variable speed means is operative.

18. In apparatus of the character described in combination, a control arm, a follower arm, a shaft connected to actuate said follower arm, variable speed means for actuating said shaft at relatively low speed, means for actuating said shaft at relatively high speed, means associated with said control and follower arms for increasing and decreasing the effective speed of said variable speed actuating mechanism upon comparatively small relative movement in one direction or the other between said control and follower arms and for causing operation of said relatively high speed actuating means upon comparatively greater relative movement between said control and follower arms, the high speed actuating means being operative only when the variable speed means is operative.

19. In apparatus of the character described driven mechanism electrical control mechanism including relatively movable pivoted arms, cooperating contacts normally disengaged, carried by the respective arms, a swinging arm arranged to engage alternatively two of the contacts for controlling the driven mechanism substantially as described.

20. In a sighting apparatus of the character described, in combination, actuating means, a driven element, a differential mechanism operatively connected to actuate the same, a motor arranged to actuate one element of the differential mechanism, a second motor arranged to actuate another element of the differential mechanism, means controlled automatically by the actuating means for controlling both motors together with a brake arranged to prevent rotation of the second motor and connections for automatically operating the brake when the first motor only is operating, and means for releasing the brake and actuating the driven element at high speed in the event of excessive lag of the driven element, substantially as described.

21. In a sighting apparatus of the character described, in combination, a plurality of motors and differential mechanism driven by said motors together with braking means controlled by the motor circuits for preventing rotation of one motor when the other motor is driving automatically, and means for releasing the brake and actuating the driven element at high speed in the event of excessive lag of the driven element, substantially as described.

22. In apparatus of the character described, driven mechanism, electrical control mechanism including relatively movable pairs of pivoted arms, pairs of cooperating contacts carried respectively on the arms of each pair but normally disengaged, a swinging arm arranged to engage alternatively either of two pairs of the aforesaid pivoted arms to close a pair of contacts for controlling the driven mechanism, substantially as described.

ALEXANDER PROCOFIEFF-SEVERSKY.